Figure 10:
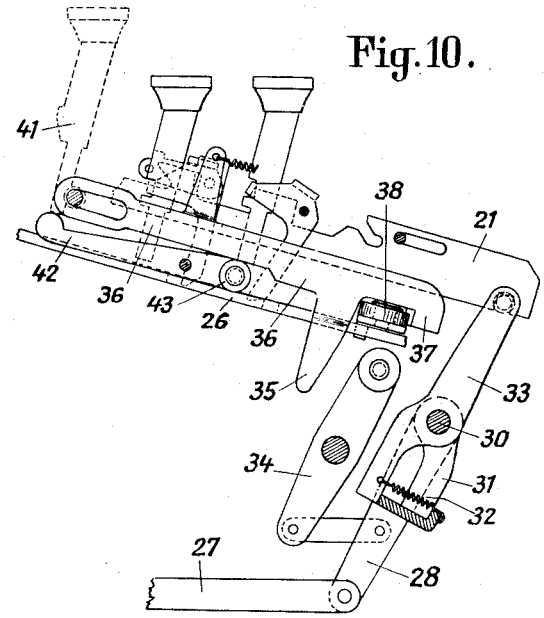

Feb. 19, 1924.
F. RAUCHWETTER
ADDING MACHINE
Filed May 19, 1921
1,484,237
4 Sheets-Sheet 1
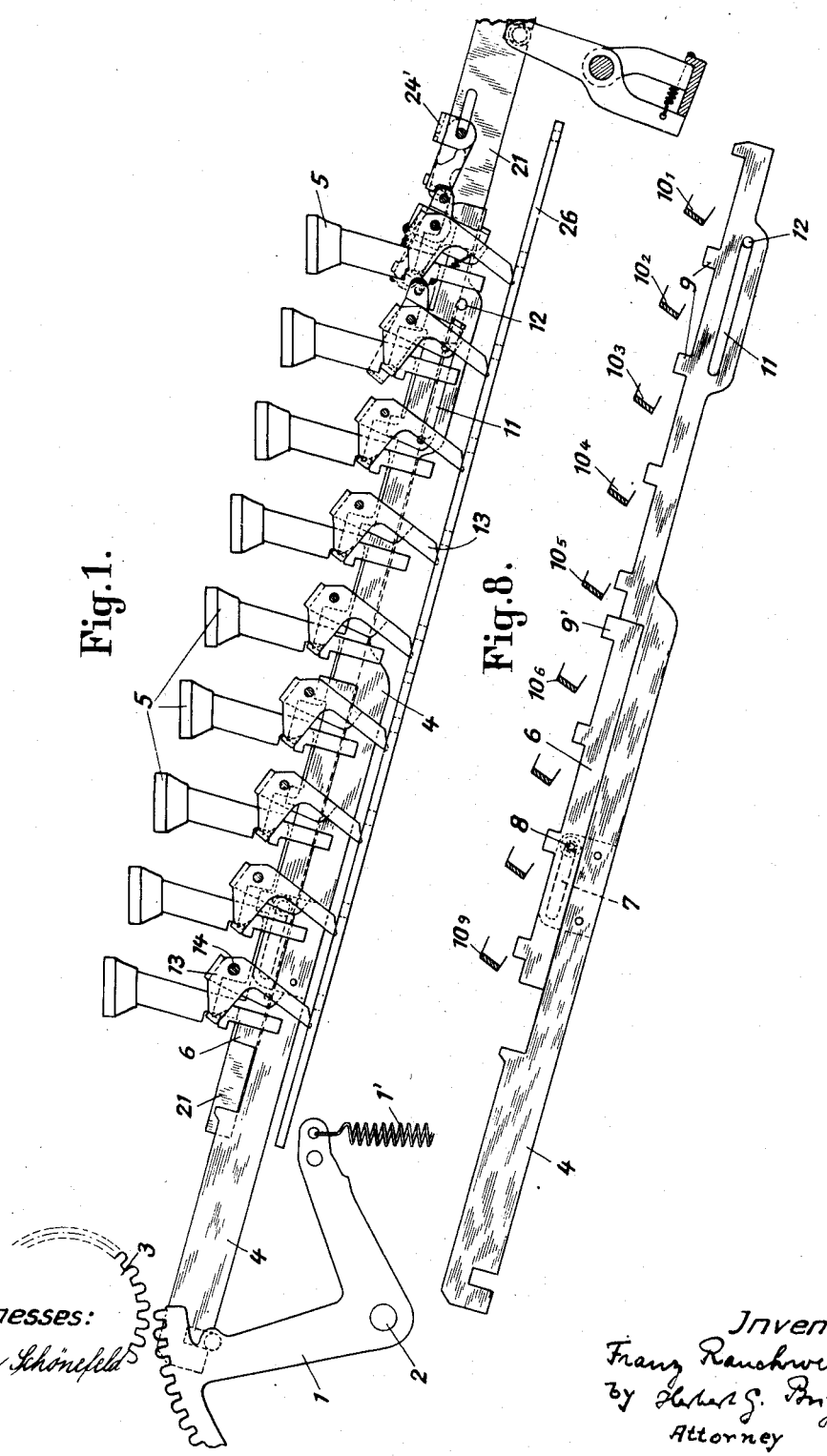

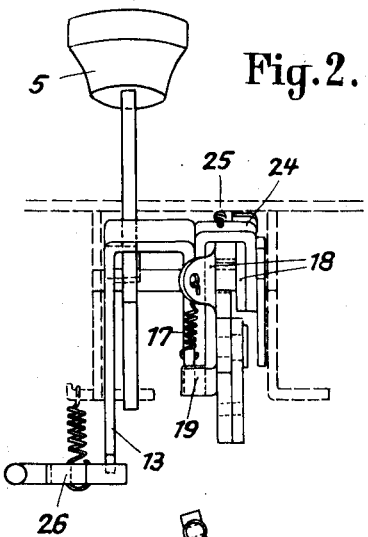
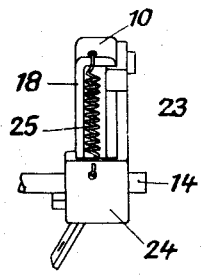
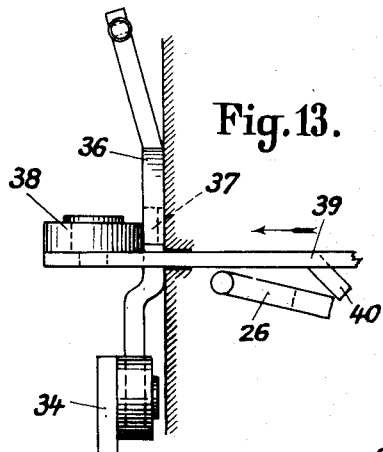
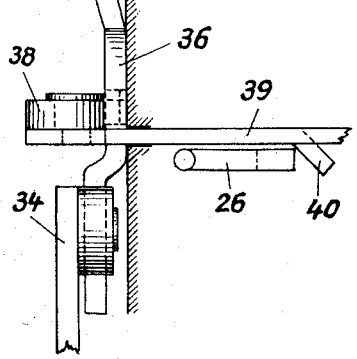
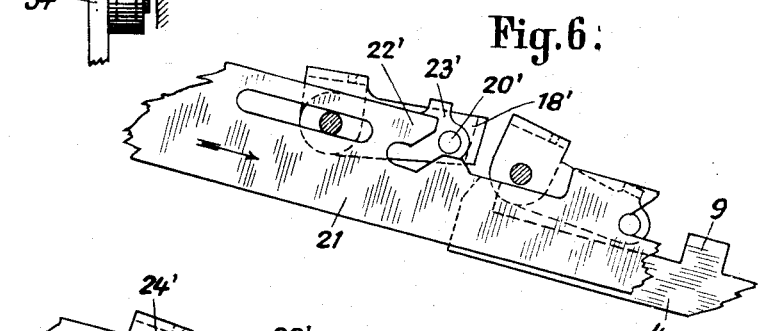
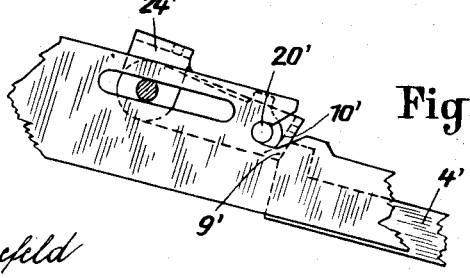

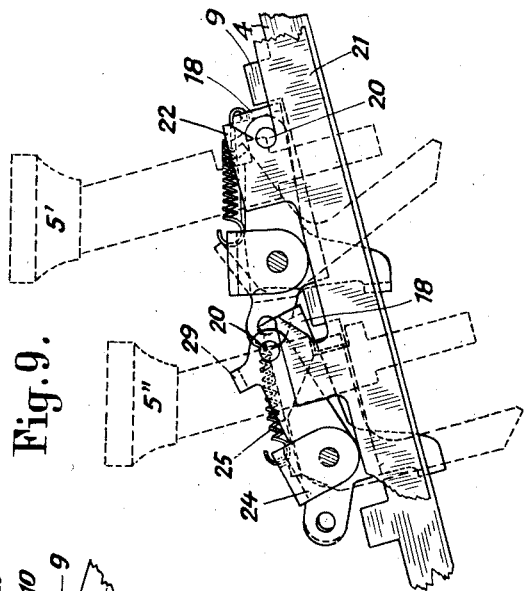
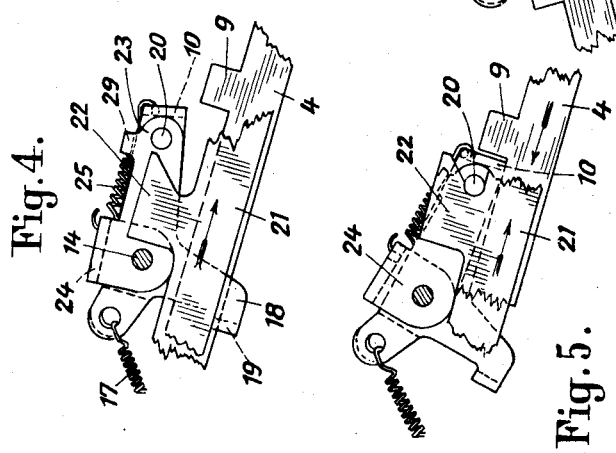
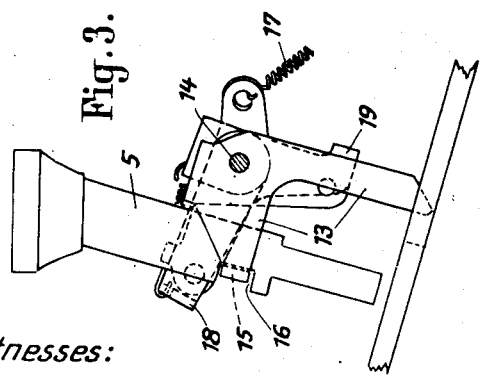

Patented Feb. 19, 1924.

1,484,237

UNITED STATES PATENT OFFICE.

FRANZ RAUCHWETTER, DECEASED, LATE OF BERLIN, GERMANY; BY ANNA RAUCHWETTER, NÉE BÖHME, ADMINISTRATRIX, OF BERLIN-FRIEDENAU, GERMANY, ALFRED FLATER, PRESENT ADMINISTRATOR OF THE ESTATE OF SAID FRANZ RAUCHWETTER, DECEASED.

ADDING MACHINE.

Application filed May 19, 1921. Serial No. 471,015.

*To all whom it may concern:*

Be it known that FRANZ RAUCHWETTER, deceased, late a citizen of the German Republic, and residing at Berlin-Friedenau, Germany, has invented certain new and useful Improvements in Adding Machines, of which the following is a specification.

This invention belongs to the class of adding machines having toothed segments driving the counting mechanism, these toothed segments being controlled from the keys by means of rails advanced by the keys after release, such advance being proportionate to the number marked upon the key.

The object of the invention is, by the simplest possible constructional design, and by means of the smallest possible number of individual parts, to be able to set a new key, before the number set by any one key has been transmitted by the driving mechanism upon the counting mechanism, the value of the subsequent key being transmitted from the drive of the machine upon the counting mechanism after the transmission of the previous key has been accomplished.

The following essentials are necessary for the solution of the problem which the inventor has set himself: (1) the peculiar design of the bell cranks limiting the stroke of the rails, which are controlled direct by the keys, (2) the peculiar design of the control rail itself.

The bell cranks which are controlled by the keys, and through the adjustment of which the stroke of the control rail is limited according to the value of the various numbers, are coupled together by a spring. By this arrangement it is possible to adjust a key in advance, before the figure-value of the key set previously, has been transmitted upon the counting mechanism.

As regards the control rail, this has also been made in two parts, being composed of two rails moving relative to each other. By this design it is possible to make the travel of the rails larger than the distance between the keys, which greatly facilitates the construction of the machine according to the chief idea of this invention. The invention is now to be described in detail according to the drawing.

Figure 11:
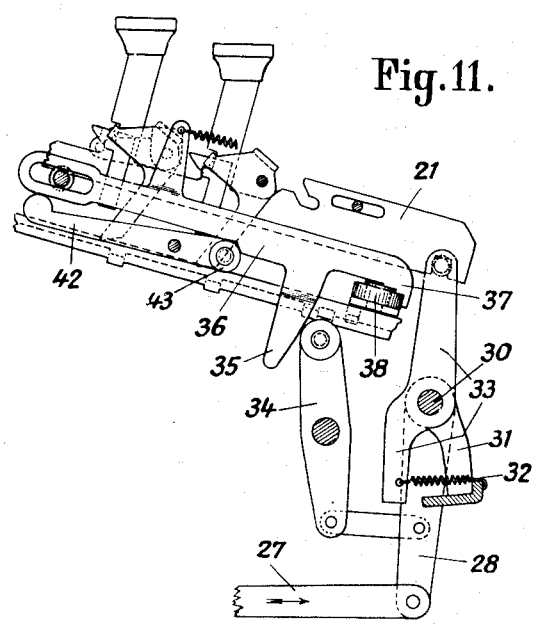

Fig. 1 represents a side view of the mechanism of the column of the machine; with the complete machine several of these being placed side by side in the frame of the machine. Figs. 2 and 3 represent a front view of one key together with the levers controlled by this key. Fig. 2$^a$ is a front view of a single lever by itself. Figs. 4, 5, and 6 show, in side view, how the levers controlled by the keys work together with the control rail by which these levers are held in the position set in advance until the movement is completed, even if a new key should be pressed down before the movement is completed. Fig. 7 shows a side view of the locking arrangement of the rail operating the toothed segment, as controlled by the cypher-key, i. e., if no other key is pressed down. Fig. 8 represents a side view of the control rail, Fig. 9 a side view of two keys in various positions of operation. Figs. 10 and 11 show a side view of the control of the catch rail from the connecting rod of the machine, in connection, with the so-called repeating key, the arrangement being shown in two different positions of operation. By this repeating key it is possible to transmit upon the counting mechanism any number set upon the keyboard as often as desired without having to reset this number upon the keyboard. Figs. 12 and 13 show details of this repeating mechanism, in front view.

1 are the known toothed segments, swinging round the pivots 2, and operated by the spring 1'. By the operation of the key these segments are caused to engage the gear wheels 3 of the counting mechanism, and are switched in such a manner by the rails 4 that the distance travelled corresponds in each case to the value of the number key 5 pressed down upon the keyboard.

The rails 4 have been made in two parts. Inside the main rail 4 shown in Fig. 8, slides an auxiliary rail 6 along a slot 7, into which it engages with a pin 8. It one of the keys 5 representing the numbers 1—4 is pressed down the rail slides along until arrested by one of its stops 9 coming up against the stops $10^1$—$10^4$ pressed down by the keys 5 of the numbers 1—4. If, however, one of the subsequent number keys is pressed down, for instance the one representing the value 5, the stop $10^5$ thereby being advance-controlled, the main rail 4 together with the auxiliary rail 6 are first shifted one unit further, i. e., until the stop $9^1$ of the auxiliary rail is arrested by the advance-controlled stop $10^5$. The auxiliary rail 6 then remains caught, whereas the main rail 4 may continue to move relative to the auxiliary rail by an amount equal to the distance of the slot 7, i. e., by four units, the length of the slot being equal to four units.

If for instance, instead of the stop $10^5$, the stop $10^6$, together with the main rail, had been controlled in advance, the auxiliary rail would have first moved by two units and then, the main rail 6 by four units, being a total of six units, etc. The advantage of this arrangement is that, without incurring constructional difficulties, the rail divisions may be made larger than the key divisions.

If the stop $10^9$ is pressed down by the key representing number 9, it does not work together direct with a rail stop, the operation being as follows: The main rail 4 is provided with a special slot 11 the length of which is equal to nine units. A locking pin 12 engages in this slot, permitting the rail to slide by an amount equal to the length of this slot, i. e., by nine units.

The operation of the rail 4 is effected in a known manner not described here in detail, either from the crank of the machine or by springs after the rail has been released. The distance through which the rail 4 travels corresponds to the number on the key pressed down, whereby the toothed segments are turned through the same distance, i. e., the numbers are transmitted upon the counting mechanism.

Typical for the invention is the special construction of the stops 10 which, by the number keys 5 are introduced into the path of the stops of the rail 4. By the keys 5 the bell cranks 13 the construction of which is known, are turned on the pivots 14. This is effected by an arm of this bell crank with a bridge piece 15 engaging in a slot 16 of the key. The bell crank 13 turns a second bell crank 18 swinging on the same pivot 14, and being acted upon by a spring 17, this turning motion being caused by a bridge piece 19 attached to the bell crank 18 which catches around the vertical lever of the bell crank 13. From the above it becomes clear that, when the key is pressed down, the bell crank 18 must follow the swinging movement of the bell crank 13. If, on the other hand, the key 5 rises thereby, taking its bell crank 13 along, the bell crank 18 is only moved along under the influence of the spring 17. Should, however, the bell crank 18 be locked by any suitable device, it is clear that it need not follow the movement of the bell crank 13 during the upward movement of the key. If for instance this bell crank 18 is arrested by any controlled mechanism when the key 5 is pressed down, a fresh key may be pressed down, and the preceding key may rise automatically without causing the accessory bell crank 18 to rise. Notwithstanding the rising of the key, the respective number on the key is transmitted upon the counting mechanism. If one key 5 is pressed down, (for instance Fig. 3) the bell crank 13 and the lever 18 which is coupled to it, assume the position shown in Fig. 3. The bell crank 18 by itself, as seen from the opposite side but otherwise in the same position is represented once more in Fig. 4. Its front arm—although indirectly—carries a pin 20 which when the key is pressed down, is introduced into the path of a locking rail 21 the pawls 22 of which, during the movement of the rail 21 in the direction of the arrow marked on Fig. 4, grip the pin 20 thereby pulling the lever 18 into the position shown in Fig. 5 in which its surface 10 (comp. Figs. 5 and 8) meets one of the stops 9 of the control rail 4 thereby limiting the stroke of the latter.

This arrangement allows the key 5 to rise before the number has been transmitted upon the counting mechanism, because the locking rail 21 automatically holds its lever 18 down until the switching movement has been completed. The pin 20 is not mounted direct upon the lever 18 but upon a special lever 23 as shown on Figs. 3, 4 and 9, this lever swinging on the same pivot 14, and to this effect gripping the lever 18 by means of the hub 14 like a fork. The lever 23 is coupled to the lever 18 by a spring 25 one end of which is attached to the hub 24 of the lever 23 whilst the other end rests against the front end of the lever 18.

Moreover the bridge piece 29 of the lever 23 is placed round the front surface of lever 18. If, when a key 5 is pressed down, lever 18 is moved downward, it will at first carry lever 23 along. In case, however, pin 20 meets an obstacle, the lever 18 will continue to move by itself, whilst at the same time the spring 25 is tightened. (Fig. 9.) When the obstacle is moved aside the lever 23 is dragged along by the spring 25. By this arrangement a new key may be pressed, before the number on the preceding key has been transmitted upon the counting mechanism. In this case lever 18 of the key 5' previously pressed down, assumes the position shown to the right on Fig. 9 whilst the position of the lever 18 belonging to the key 5", pressed immediately afterwards is shown to the left of Fig. 9. The pin 20 of the lever 23 pulls at the front surface of the pawl 22 whereby the spring 25 is tightened, whilst lever 18 is lowered further downward. If, after the transfer of the number from the key 5 upon the counting mechanism, the locking rail 21 is moved to the left (Fig. 9) the pin 20 resting upon the pawl 22 is released, and moves under the influence of a spring 25 until the bridge piece 29 of the lever 23 rests on the lever 18. In this position, however, the pin 20 is again in the path of the pawl 22, so that during a renewed switching movement of the locking rail 21 it is caught by the latter, the lever 18 thereby being brought into the path of the stops 9 of the locking rail 4.

Figs. 6 and 7 show the arrest of the locking rail 4 by a special lever 18', this arrangement coming into action when no number key is pressed down.

The lever 18' and the lever 23' which is coupled to it in the manner described above, work in conjunction with a pawl 22' the travel of which before the arrest of the pin 20', equals the travel of the locking rail up to the arrest of the pins 20 belonging to the number keys. (Fig. 6.) The pin 20' therefore, can only be arrested if none of the pins 20 has been caught. If the pin 20' has been caught its lever 18' assumes the position shown in Fig. 7, in which the front edge 10' places itself before the front edge 9' of the locking rail 4, thereby locking the latter. The folding rail 26, holding down the respective key pressed down by means of the vertical arm of the lever 13 until another key has been pressed down, is a known element of construction, and therefore need not be described in detail. The key must be held down until the first number is run in so that the locking bar 21 can engage pin 20.

The mechanism of the repeating key and the drive of the locking rail are represented on Figs. 10 and 11, showing two positions in side view, and again on Figs. 12 and 13, being part of a front view.

The slide rod 27 swings the lever 28 round the pin 30. This at first takes lever 31 along, and then again, by means of the coupling spring 32 the double lever 33 the upper arm of which drives the locking rail 21. As the travel of the locking rail varies, as explained above, whilst the travel of the slide rod 27 is fixed, the spring 32 serves as compensating arrangement (Fig. 11).

Then lever 28 also effects the release of a key pressed down. It drives a double lever 34 the upper arm of which, at the end of its travel, pushes against the projection 35 of the slide rod 36. The claw 37 of the latter takes the roller 38 of a slide rod 39 along, which with the chamfered edge 40 (Figs. 12 and 13), pushes the folding rail 26 downward, i. e., releases it.

If this release is to be avoided, i. e., if the key pressed down is to remain in this position, so that the value is to be transmitted again into the counting mechanism, all that is required is, to press down the repeating key 41, as shown in Fig. 10. Thereby the double lever 42 is swung over, so that its roller 42 raises the rail 36 until the claw 37 of this rail moves out of the way of the roller 38 so that, when the rail 36 is moved by the lever 34 the roller 38 is no longer along i. e. the folding rail 26 is no longer released.

I claim:

1. In an adding machine, the combination, with number keys; operating gearings having toothed segments; operating bars adapted to control said gearings; and angularly shaped levers adapted to be preliminarily adjusted by said keys and to limit the path of said bars, said levers having three members and being adapted to oscillate upon pivots and being coupled with said number-keys; locking rails adapted to be controlled by the machine shaft and to co-operate with two of the members of said angularly shaped levers; pawls attached to said rails; and said operating rails, having abutments provided on them at different distances, and being adapted to co-operate with said toothed segments, for the purpose as described.

2. In an adding machine, the combination, with number keys; operating gearings having toothed segments; operating bars adapted to control said gearings; and levers adapted to be preliminarily adjusted by said keys and to limit the path of said bars, said levers being angularly shaped and adapted to oscillate upon pivots and being coupled with said number-keys; other angularly shaped levers arranged coaxially with the first-mentioned angularly shaped levers, and bridging members connecting each one of said latter (keys) levers at one side with one of said other levers; still other angularly shaped levers, and springs connecting each one of these lastly mentioned levers at one side with one of the levers mentioned in the second place; locking rails; pawls attached to these rails, and pins secured to the levers mentioned in the third place and engaging said pawls, for the purpose as described.

3. In an adding machine, the combination, with number keys; operating gearings having toothed segments; operating bars adapted to control said gearings; and levers adapted to be preliminarily adjusted by said keys and to limit the path of said bars, said levers being angularly shaped and having three members and being adapted to oscillate upon pivots and being coupled with said number-keys; locking rails adapted to be controlled by the machine shaft and to co-operate with the members of said angularly shaped levers; pawls attached to said rails; and said operating rails adapted to co-operate with said toothed segments; other levers not coupled with the keys; pins on these levers; and pawls also attached to the said rails and being adapted to check the said operating bars if the number keys are not depressed, substantially as described.

4. In an adding machine, the combination, with number keys; operating gearings having toothed segments; operating bars adapted to control said gearings; and levers adapted to be preliminarily adjusted by said keys and to limit the path of said bars, said levers being angularly shaped and having three members and being adapted to oscillate upon pivots and being coupled with said number-keys; locking rails adapted to be controlled by the machine shaft and to cooperate with the members of said angularly shaped levers; said bipartite operating bars being the one portion having slots, and the other having pins engaging said slots and adapted to be displaced along upon the other bar portion and lugs forming parts of said bipartite bars and being adapted to cooperate with abutments of the said angularly shaped levers, substantially as described.

5. In an adding machine, the combination, with number keys; operating gearings having toothed segments; operating bars adapted to control said gearings; and levers adapted to be preliminarily adjusted by said keys and to limit the path of said bars, said levers being angularly shaped and having three members and being adapted to oscillate upon pivots and being coupled with said number-keys; locking rails adapted to be controlled by the machine shaft and to cooperate with the members of said angularly shaped levers; oscillating rails having recesses adapted to receive elongated arms of said angularly shaped levers; and said operating bars adapted to actuate the operating segments and to co-operate with the lugs of the said angularly shaped levers, substantially as described.

6. In an adding machine, the combination, with number keys; operating gearings having toothed segments; operating bars adapted to control said gearings; and levers adapted to be preliminarily adjusted by said keys and to limit the path of said bars, said levers being angularly shaped and having three members and being adapted to oscillate upon pivots and being coupled with said number-keys; locking rails adapted to be controlled by the machine shaft and to cooperate with the members of said angularly shaped levers; said operating bars being bipartite bars and adapted to actuate the operating segments; oscillating rails with recesses for the elongated arms of the angularly shaped levers; a system of levers so arranged as to be adapted to be intermittently moved by the machine shaft and to release in its turn said oscillating rails at every rotary motion of the machine crank; substantially and for the purpose as described.

In testimony whereof I affix my signature in presence of two witnesses.

Frau ANNA RAUCHWETTER, geb. BÖHME,
*Administratrix of Franz Rauchwetter, deceased.*

Witnesses:
 HERMANN REISING,
 WALDEMAR WARINSKI.